United States Patent [19]

Hass

[11] 4,236,689
[45] Dec. 2, 1980

[54] CONNECTOR MOLD WITH FLEXIBLE WIRE GUIDE

[75] Inventor: Alan R. Hass, Albion, Ind.

[73] Assignee: Lyall Electric, Inc., Albion, Ind.

[21] Appl. No.: 47,320

[22] Filed: Jun. 11, 1979

[51] Int. Cl.³ ............................................. B22D 19/04
[52] U.S. Cl. ...................................... 249/204; 249/95; 249/97; 425/116; 425/123; 425/129 R; 425/DIG. 44
[58] Field of Search ............... 425/DIG. 44, 123, 116, 425/129 R; 249/95, 97, 204

[56] References Cited

U.S. PATENT DOCUMENTS

| | | | |
|---|---|---|---|
| 1,815,721 | 7/1931 | McGraw | 425/123 |
| 3,158,907 | 12/1964 | Pavicevic | 425/DIG. 44 |
| 3,255,302 | 6/1966 | Frank | 249/95 |
| 3,564,709 | 2/1971 | Hickton | 264/272 |
| 4,174,367 | 11/1979 | Breker | 425/123 |

*Primary Examiner*—Maurice J. Welsh
*Attorney, Agent, or Firm*—Gust, Irish, Jeffers & Rickert

[57] ABSTRACT

A flexible insert arrangement for an electrical connector mold for supporting leads extending therefrom and closing the mold end is disclosed and includes a flat resilient body having one or more lead-accepting depressions normal to the body across one edge thereof and an arrangement actuable as the mold halves are closed on one another for deforming the body to temporarily displace the body resilient material about each electrical lead extending from the mold to complete the formation of an insulating material-accepting connector forming cavity.

9 Claims, 5 Drawing Figures

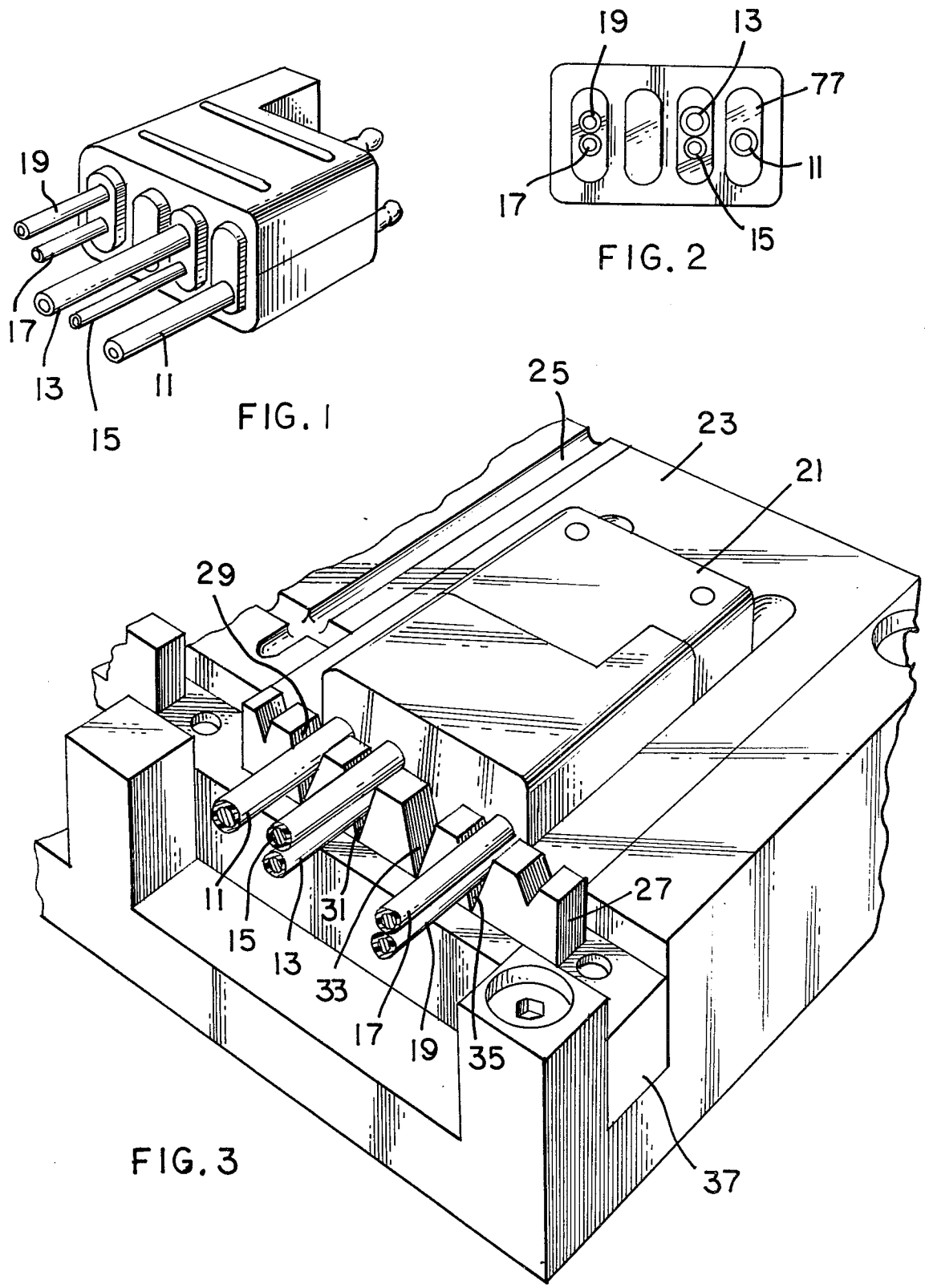

CONNECTOR MOLD WITH FLEXIBLE WIRE GUIDE

BACKGROUND OF THE INVENTION

The present invention relates generally to the forming of insulated electrical connectors and more particularly to the molding of such connectors about terminals having leads extending therefrom.

Terminal-containing electrical connectors are frequently formed by injecting a synthetic resin into a mold cavity in which the terminals are supported with the associated leads extending from the cavity through so-called wire guides which are sometimes also referred to as wire pinch-off or shut-off members. Such wire guides are normally made of steel and are frequently formed as an integral part of the connector mold. For molds in which various lead sizes may be employed, the wire guides may be made as a removable steel piece having fixed closely fitting wire passing apertures. Some attempts have been made at forming wire guides from flexible materials with one such arrangement for single wires extending from the mold being the provision of a generally flat bar of a urethane material arranged so that upon closing of the mold halves, the single wire is displaced into the urethane bar, effectively closing off the end of the mold cavity from which the single lead extends.

In the molding of multiple-lead multiple-terminal electrical connectors, such as eight way trailer connectors of the general type illustrated in U.S. Pat. No. 3,564,709, fixed size steel wire guides are typically employed. While such fixed aperture wire guides are well suited to high production, long term runs of a specified connector having specified numbers and sizes of leads, this arrangement is not well suited to the production of small volume, frequently changed parts made in the same mold. In this general type situation where wires are stacked on wires, guides made from materials, such as urethanes, have been tried with slots cut to the wire gauge size, however, these guides have not met with any measure of success, and are not capable of coping with differing numbers and sizes of leads emanating from connectors formed in the same mold.

SUMMARY OF THE INVENTION

Among the several objects of the present invention may be noted the provision of a wire guide adaptable to a wide variety of numbers and sizes of leads; the provision of an electrical connector mold especially suited to short runs of connectors having differing terminals and lead configurations; the provision of a method of manufacturing an insulated electrical connector having terminals therein and electrical leads connected to the terminals extending therefrom employing a deformable wire guide which may be made to conform closely about the leads to define the enclosed terminal-containing region into which insulating material in a flowable state may be introduced; and the provision of a process for manufacturing multi-terminal connectors characterized by its ready adaptability to differing lead configurations. These as well as other objects and advantageous features of the present invention will be in part apparent and in part pointed out hereinafter.

In general, insulated electrical connectors are fabricated by positioning terminals within a first mold cavity portion with leads from those terminals extending in the same general direction and engaging a notched resilient wire guide and closing a second mold cavity portion on the first portion while deforming the wire guide to conform closely about the leads to define the enclosed region into which insulating material is introduced.

Also in general and in one form of the invention, a flexible insert for an electrical connector mold for closing an otherwise open mold end about electrical leads and adapted for use with a variety of lead numbers and sizes includes a generally flat rectangular body of resilient material having a plurality of lead-accepting notches along one edge and is deformable to temporarily displace resilient material to form about the leads and complete the formation of an insulating material-accepting connector-forming cavity.

BRIEF DESCRIPTION OF THE DRAWING

FIG. 1 is a perspective view of an exemplary eight way trailer connector formed by the process of the present invention;

FIG. 2 is a lead end plan view of the connector of FIG. 1;

FIG. 3 is a perspective view of an electrical connector mold half with the leads from a finished connector engaging the notched resilient wire guide;

Corresponding reference characters indicate corresponding parts throughout the several views of the drawing.

Figure 4:
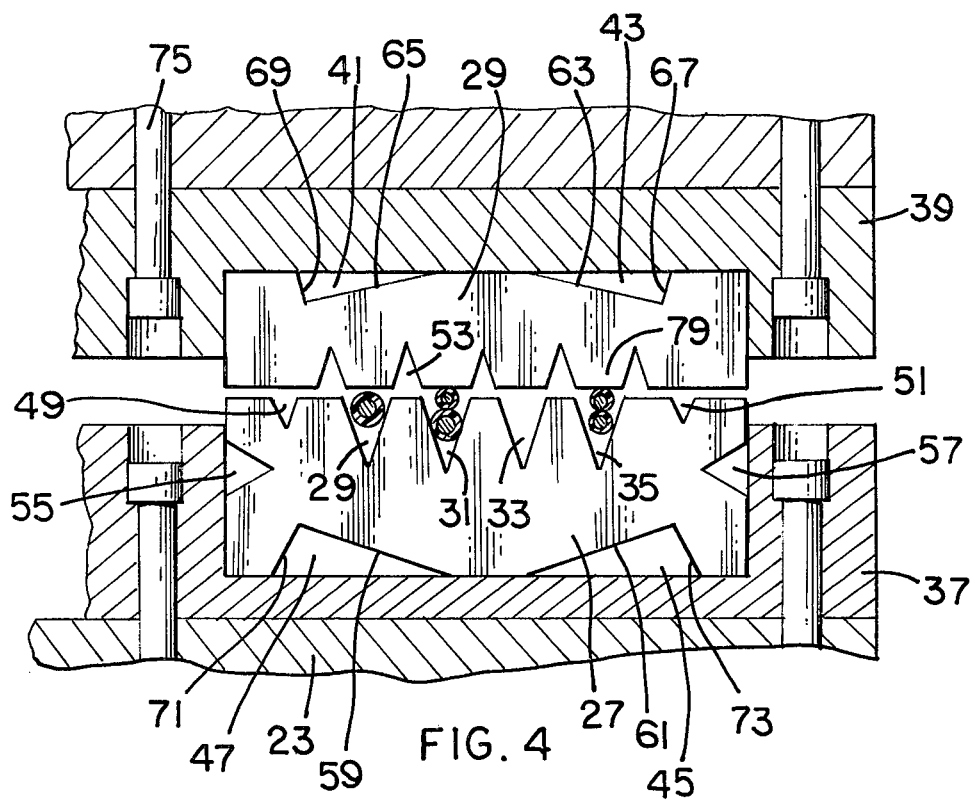
FIG. 4 is an end view of separated mold halves illustrating leads in position in the notched undeformed wire guide.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

The manufacture of an eight way connector of the type illustrated in FIGS. 1 through 3 typifies the present invention. This type connector is manufactured in a wide variety of configurations for a large number of applications including the application from which it derives its common name "eight way trailer connector". In most installations the illustrated connector will, of course, mate with a similar connector with individual female terminals of each connector normally being hot lines, and the corresponding prongs normally not being hot when the connector is not connected. In frequent typical installations less than all eight positions are used and further for economic reasons lead size is no greater than required by the current requirements of the particular installation. To be completely versatile such a connector might have leads of anywhere between ten and sixteen gauge wire in any of the eight possible positions. The illustrated connector has relatively large leads 11 and 13 with three smaller leads 15, 17 and 19, and three unused positions. The manner of supporting the terminals within the mold cavity prior to injecting insulating material is known in the prior art as is the forming of the connector as a partially male, partially female connector. As illustrated in FIG. 3, a rear mold die 21 which may be an integral part of the mold halves or a removable insert supports the several terminals while determining the connector configuration. Die portion 23 may be one half of a multiple cavity mold having a conventional gate 25 for conducting the flowable insulating material to the several cavities. Within this rather conventional state of the art process for forming connectors, an exemplary embodiment of the present invention concerned primarily with forming the connector end visible in FIG. 2 in a manner independent of the number or size of leads, such as 11, 13, 15, 17 and 19, will be described.

Figure 5:
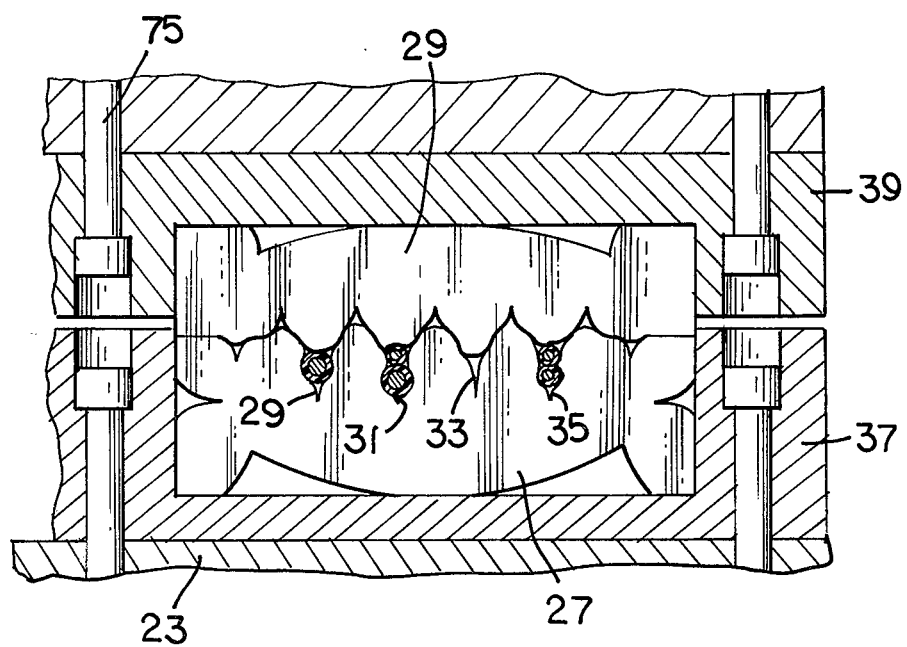
FIG. 5 is a view similar to FIG. 4, but illustrating the mold halves nearly closed and the wire guide deformed to conform closely about the leads.

The flexible insert 27 is seen in FIGS. 3, 4 and 5 to comprises a generally flat rectangular body of resilient material having a plurality of lead-accepting notches 29, 31, 33 and 35 along an upper edge thereof. When the terminals are positioned within the mold cavity portion 23, the leads all extend therefrom in the same general direction and engage corresponding ones of these notches in the resilient wire guide 27. When the second mold cavity portion closes on the first, wire guide 27 is deformed as illustrated in FIG. 5 to conform closely about the leads and to define the enclosed region containing the terminals into which insulating material in a flowable state is introduced as by gate 25 to form the finished connector. The first and second mold cavity portions when closed on one another define all the connector faces except the face illustrated in FIG. 2, which is the connector face from which the leads emanate and which is defined at least in part by the resilient wire guide 27.

As the mold halves close, another notched resilient member 29 intermeshes with the wire guide 27 and both resilient members are deformed as the mold cavity portions close on one another. Both notched resilient member 27 and 29 are supported in directions normal to the closing direction by channels 37 and 39 which upon closing tend to concentrate the body deformation in the lead region. To aid in the displacement of resilient material in the region of the leads, each rectangular body is provided with undercut regions 41, 43, 45 and 47. Thus, as displacement of the inserts 27 and 29 begins, the central four wire slots 29, 31, 33 and 35 begin to close, with the teeth of insert 29 forcing the wires deeply into the corresponding wire slots. Continued closing of the connector mold halves toward one another results in deformation of the wire guide 27 and its mating insert 29 so that when the halves are nearly completely closed, all of the wire slots are effectively closed regardless of whether the particular slot contains a lead or not, much as illustrated in FIG. 5.

Many materials, including a variety of thermo-plastic elastomers, are considered suitable for the resilient inserts, and an exemplary polyurethane insert set for molding an eight way connector about one and one-eighth inches wide and five-eighths of an inch deep may be approximately dimensioned as follows. Each of the inserts is about three-sixteenths of an inch thick with the lower wire guide 27 being about three-quarters of an inch high and two and three-sixteenth inches wide, while the upper insert 29 is of the same width but only about one-half inch high. Wire guide 27 extends above the channel or U-slotted steel frame 37 by about one-eighth of an inch, while the insert 29 extends down from its channel 39 by about three-sixteenths of an inch. Lead-accepting notches 29, 31, 33 and 35 are each formed by substantially straight side portions intercepting at a vertex, forming about a thirty degree angle between the side portions, while compression notches, such as 49 and 51, of insert 27, have sides sloped at about twenty degrees to the vertical or central angles of about forty degrees. The corresponding notches, such as 53 of insert 29 are also of an approximately forty degree central angle, while compression notches 55 and 57 form a central angle of about sixty degrees. To obtain proper deformation, the other relieved regions of the inserts have edges 59, 61, 63 and 65 inclined to a hypothetical vertical line, as viewed in FIG. 4 at about sixty-five degrees, while edges 67 and 69 are inclined at about twenty degrees, and edges 71 and 73 are inclined at about thirty-five degrees.

In summary then, the inserts 27 and 29 being longer in the vertical direction as viewed in FIGS. 4 and 5, than the corresponding steel frame, must be displaced as the mold halves close on one another. As displacing occurs, the inserts have a lesser area to occupy and collapse toward the wire slots and other notches. The interlocking of the two inserts provides a clinching effect to complete the closure of the wire slots. When the mold halves are opened, the resiliency of the material causes the two inserts to return to their original configuration.

The channels in which the inserts reside may be open at the ends with the inserts held in place by transverse ends or may be closed at the ends as illustrated, and in either case may be held in place in the respective mold halves by cap screws, such as 75. These channels may also be adapted to function as a further wire guide or wire guide halves of general configuration defining the elliptical or oval sections, such as 77 in FIG. 2, with such wire guide halves of general configuration being interposed between the resilient inserts 27 and 29 and the connector, if desired. Such generalized wire guide portions reduce the overall pressure exerted on the resilient inserts during connector formation by substantially reducing the insert area subjected to the insulating material. Of course, notches 41, 43, 45, 47, 49, 51, 55 and 57 are shielded from the insulating material entering the cavity and need not themselves close to seal. Thus, the actual pressure experienced by the resilient inserts is effective only on a relatively small area of those inserts in the region of the lead-accepting notches and mating teeth, such as 79.

From the foregoing, it is now apparent that a novel method and apparatus for fabricating a multiple conductor connector adaptable to various lead configurations has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A flexible insert arrangement for an electrical connector mold for closing an otherwise open mold end from which electrical leads extend, the same insert adapted for use with a variety of lead numbers and sizes, the arrangement comprising:
   a first generally flat rectangular body of resilient material having a plurality of lead accepting notches along one edge thereof;
   means for deforming the first rectangular body to temporarily displace resilient material to form about the leads to complete the formation of an insulating material accepting connector forming cavity; and
   an additional generally flat rectangular body of resilient material having a plurality of teeth along one edge thereof alignable with corresponding lead accepting notches of the first rectangular body, the means for deforming including means for aligning the teeth and lead accepting notches and for forcing the first body and the additional body toward one another interlocking the teeth and lead accepting notches with leads captured therebetween.

2. The insert arrangement of claim 1 further comprising channel means for supporting the rectangular bodies to concentrate body deformation in the lead region.

3. The insert arrangement of claim 1 wherein each rectangular body is provided with undercut regions along edges opposite their respective notched and toothed edges to aid the displacement of resilient material in the lead region.

4. The insert arrangement of claim 3 further comprising channel means for supporting the rectangular bodies to concentrate body deformation the lead region, the undercut regions being located wholly within the channel means.

5. The insert arrangement of claim 1 wherein the size of the lead accepting notches is substantially independent of lead size over a range of lead sizes.

6. The insert arrangement of claim 1 wherein each lead accepting notch is formed by substantially straight side portions intersecting at a vertex forming about a 30° angle between the side portions.

7. The insert arrangement of claim 1 wherein the connector mold comprises first and second mold halves separable along a parting plane, the means for deforming being actuable contemporaneously with the closing of the mold halves to define an enclosed region from which electrical leads extend and into which insulating material in a flowable state may be introduced to form an electrical connector.

8. A flexible insert arrangement for an electrical connector mold having first and second mold halves separable along a parting plane for closing an otherwise open mold end from which at least one electrical lead extends comprising:
   a generally flat body of resilient material having at least one lead accepting depression extending normal to the body across one edge thereof; and
   means for deforming the body to temporarily displace resilient material to form the resilient material about each electrical lead extending from the mold to complete for formation of an insulating material accepting connector forming cavity, the means for deforming being actuable contemporaneously with the closing of the mold halves to define an enclosed region from which the electrical lead extends and into which insulating material in a flowable state may be introduced to form a connector.

9. A flexible insert arrangement for an electrical connector mold having first and second mold halves separable along a parting plane for closing an otherwise open mold end from which electrical leads extend, the same insert adapted for use with a variety of lead numbers and sizes, the arrangement comprising:
   a first generally flat rectangular body of resilient material having a plurality of lead accepting notches along one edge thereof; and
   means for deforming the first rectangular body to temporarily displace resilient material to form about the leads to complete the formation of an insulating material accepting connector forming cavity, the means for deforming being actuable contemporaneously with the closing of the mold halves to define an enclosed region from which electrical leads extend and into which insulating material in a flowable state may be introduced to form an electrical connector.

* * * * *

UNITED STATES PATENT AND TRADEMARK OFFICE
CERTIFICATE OF CORRECTION

PATENT NO. : 4,236,689
DATED : December 2, 1980
INVENTOR(S) : Alan R. Hass

It is certified that error appears in the above-identified patent and that said Letters Patent are hereby corrected as shown below:

Column 3, line 12, "comprises" should be ---comprise---.

Column 3, lines 33 and 34, "member" should be

---members---.

IN THE CLAIMS

Claim 8, Col. 6, line 10, "for" should be ---the---.

Signed and Sealed this

Seventeenth Day of March 1981

[SEAL]

Attest:

RENE D. TEGTMEYER

Attesting Officer

Acting Commissioner of Patents and Trademarks